(12) United States Patent
Peters et al.

(10) Patent No.: US 10,507,584 B2
(45) Date of Patent: Dec. 17, 2019

(54) FIXTURE MANIPULATION SYSTEMS AND METHODS

(71) Applicant: Dishcraft Robotics, Inc., San Carlos, CA (US)

(72) Inventors: Kenneth M. Peters, San Mateo, CA (US); Paul M. Birkmeyer, Redwood City, CA (US)

(73) Assignee: DISHCRAFT ROBOTICS, INC., San Carlos, CA (US)

( * ) Notice: Subject to any disclaimer, the term of this patent is extended or adjusted under 35 U.S.C. 154(b) by 62 days.

(21) Appl. No.: 15/679,023

(22) Filed: Aug. 16, 2017

(65) Prior Publication Data
US 2018/0050453 A1 Feb. 22, 2018

Related U.S. Application Data

(60) Provisional application No. 62/376,222, filed on Aug. 17, 2016.

(51) Int. Cl.
*B25J 9/16* (2006.01)
*B25J 9/10* (2006.01)
*G05B 19/402* (2006.01)

(52) U.S. Cl.
CPC ............ *B25J 9/1697* (2013.01); *B25J 9/10* (2013.01); *B25J 9/1687* (2013.01); *G05B 19/402* (2013.01); *G05B 2219/37555* (2013.01); *G05B 2219/40032* (2013.01); *G05B 2219/49113* (2013.01)

(58) Field of Classification Search
CPC .......... B25J 9/1697; B25J 9/10; B25J 9/1687; G05B 19/402; G05B 2219/37555; G05B 2219/40032; G05B 2219/49113

USPC ............................................................ 700/59
See application file for complete search history.

(56) References Cited

U.S. PATENT DOCUMENTS

| | | | |
|---|---|---|---|
| 3,831,736 A * | 8/1974 | Barnes | B05C 13/02 118/324 |
| 5,265,317 A * | 11/1993 | Angel | B23P 21/00 228/212 |
| 5,727,391 A | 3/1998 | Hayward | |
| 6,301,763 B1 | 10/2001 | Pryor | |
| 8,534,728 B1 | 9/2013 | Bosscher et al. | |
| 2002/0161482 A1* | 10/2002 | Dugas | B23Q 3/18 700/245 |
| 2004/0080087 A1 | 4/2004 | Lin | |
| 2008/0106008 A1* | 5/2008 | Kasai | B28B 11/243 264/601 |
| 2009/0055024 A1 | 12/2009 | Kay | |
| 2013/0118689 A1* | 5/2013 | Okuda | B05D 1/32 156/378 |
| 2015/0032252 A1 | 1/2015 | Galluzzo | |

(Continued)

FOREIGN PATENT DOCUMENTS

JP 5291158 9/2013

*Primary Examiner* — Kenneth M Lo
*Assistant Examiner* — Michael W Choi

(57) ABSTRACT

Example systems and methods are described that are capable of manipulating fixtures and objects. In one implementation, a system includes a robotic actuator and a processing system configured to generate commands for positioning the robotic actuator. A vision system is configured to process visual information proximate the robotic actuator. The robotic actuator is configured to manipulate a fixture, where the fixture is configured to be placed on a work surface to aid in manipulating an object.

20 Claims, 9 Drawing Sheets

(56) References Cited

U.S. PATENT DOCUMENTS

| | | | |
|---|---|---|---|
| 2017/0196131 A1* | 7/2017 | Ishikawa | H05K 13/022 |
| 2017/0291806 A1* | 10/2017 | Lessing | B25J 15/0023 |
| 2018/0111239 A1* | 4/2018 | Zak | B23Q 7/18 |
| 2018/0122572 A1* | 5/2018 | Kuribayashi | B05D 5/12 |
| 2018/0339867 A1* | 11/2018 | Hasegawa | B65G 47/52 |

* cited by examiner

FIXTURE MANIPULATION SYSTEMS AND METHODS

RELATED APPLICATION

This application claims the priority benefit of U.S. Provisional Application Ser. No. 62/376,222, entitled "Robotic Manipulation Aided by Movable Fixtures," filed on Aug. 17, 2016, the disclosure of which is hereby incorporated by reference herein in its entirety.

TECHNICAL FIELD

The present disclosure relates to systems and methods that use robots, such as robotic actuators, to manipulate fixtures that aid in the manipulation of objects.

BACKGROUND

In many situations, a robotic actuator is useful for moving objects between two locations. The process of automating movement of objects between locations involves the need to manipulate the objects, which includes properly grasping the object. In some situations, grasping an object is difficult due to the object's placement, position, shape, and so forth. In these situations, a fixture may be useful to aid in the manipulation of the object. There exists a need, therefore, for an automated method of manipulating fixtures to make manipulation of the object easier by the robotic actuator.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
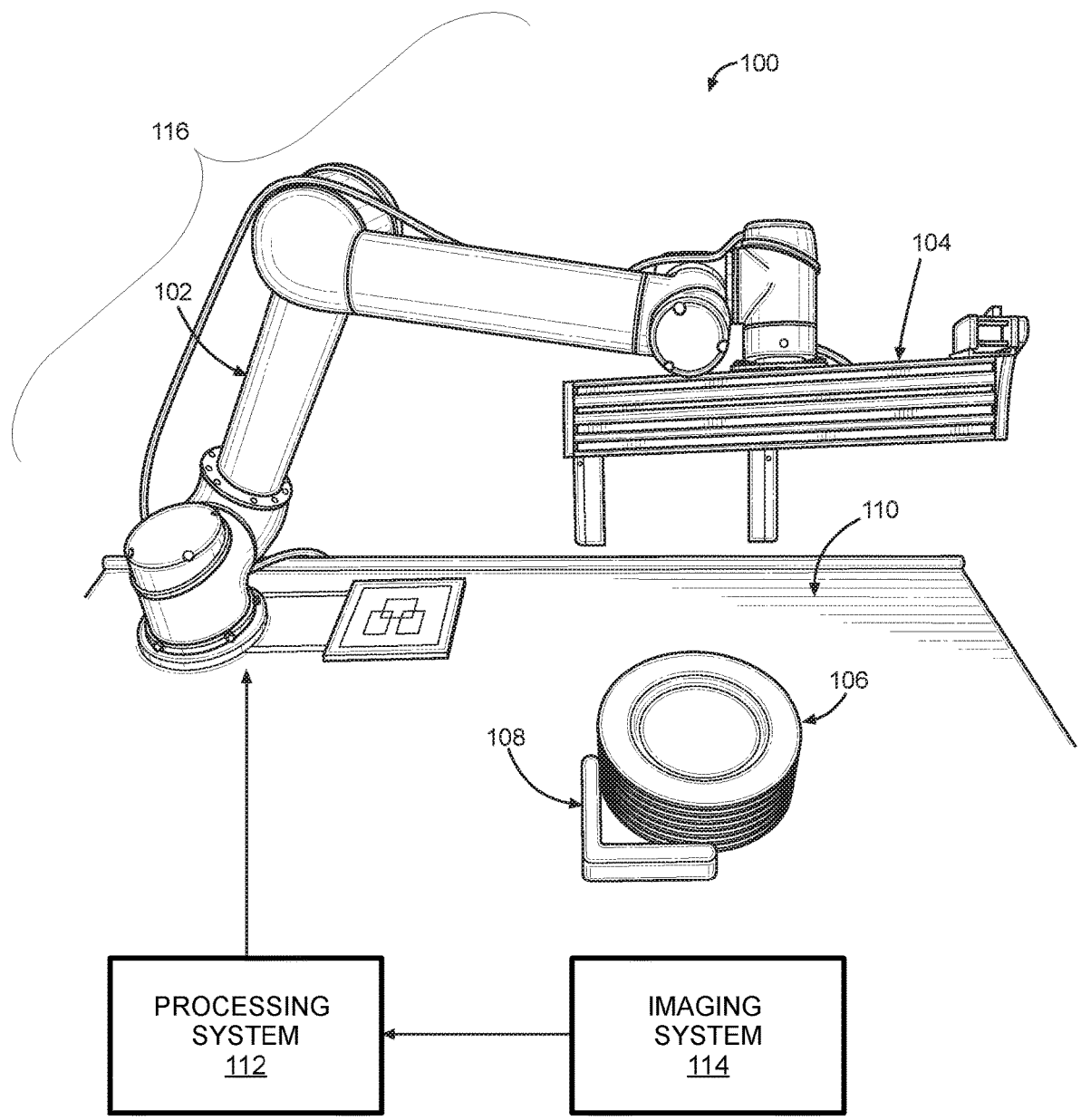
FIG. 1 is a schematic diagram depicting an embodiment of a robotic system configured to manipulate fixtures, dishware, and other objects.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

The systems and methods described herein use a robotic system configured to manipulate fixtures, dishes and other objects. In some embodiments, the robotic system includes a robot or robotic actuator, a processing system, a computer vision system, and an end effector. The present disclosure adapts robotic manipulation to automate, for example, the labor of loading dishes (or dishware) into a dishwashing machine. Automating the process of loading dishes into a dishwashing machine includes using a computer vision system to identify the type of dishware and the pose (physical orientation) of the dishware, and then uses a robotic end effector to obtain a grasp of the dishware. The grasped dishware is then moved to a rack (or other structure), and a combination of the computer vision system and robotic end effector is used to release the grasped dishware into the rack. The same robotic system is used to place fixtures on a work surface to assist with the moving of dishware and other objects. Additionally, the robotic system may be used to move any type of object or item in any environment.

FIG. 1 is a schematic diagram depicting an embodiment of a robotic system 100 configured to manipulate fixtures, dishware, and other objects. In some embodiments, robotic system 100 includes a robotic arm 102, coupled to an end effector 104. In some embodiments, the combination of robotic arm 102 and end effector 104 is referred to as a robotic actuator 116. Additionally, end effector 104 may also be referred to as a "gripper" or "grasper" herein. For example, robotic actuator 116 may be configured to manipulate one or more fixtures, articles of dishware, or other objects. In some embodiments, robotic actuator 116 may be any one of a robotic arm with any number of pivot points, a robotic arm with multiple degrees of freedom, a single-axis robotic arm, or any other robotic system such as a Selective Compliance Articulated Robot Arm (SCARA) robot, a Delta robot, or other system capable of changing the position of an end effector. End effector 104 may be any type of device capable of picking up or moving a fixture, dish, or other object. In the example of FIG. 1, end effector 104 is a pincer style robotic manipulator. In other embodiments, end effector 104 may be a magnetic end effector, pneumatic end effector, vacuum gripper, robotic tentacles, mechanical hands that mimic human physiology, or any other type of end effector capable of grasping or moving a fixture, dish, object, and the like.

In some embodiments, end effector 104 may comprise a mechanical drive system that includes pneumatic, hydraulic, magnetic, or spring-loaded mechanisms that may be used to provide actuation (gripping) and release actions associated with an object.

As shown in FIG. 1, robotic arm 102 is mounted proximate a work surface 110 that is made of any type of material, such as stainless steel or any other appropriate material. In this embodiment, an L-shaped fixture 108 (also referred to as an L-shaped bracket) has been placed on work surface 110 to help align a stack of dishes 106 in a known (or predetermined) position. When robotic arm 102 uses its end effector 104 to remove dishes 106 from work surface 110, L-shaped fixture 108 is used as a brace to prevent dishes 106 from sliding on work surface 110 as dishes 106 are grasped by end effector 104. For example, L-shaped fixture 108 resists the lateral force applied by robotic arm 102 (and end effector 104) when grasping one or more dishes 106. As discussed in greater detail herein, L-shaped fixture 108 may be temporarily or permanently attached to work surface 110 by gravitational force, friction, magnetic attraction, adhesive, or any other attachment mechanism. As discussed herein, dishes 106 may be moved by robotic arm 102 from a first position (the position shown in FIG. 1) to a second position, such as a dish rack, storage bin, and the like.

In some embodiments, robotic arm 102 is a multi-axis robotic arm. In other embodiments, robotic arm 102 may be a gantry-type Cartesian robot, a SCARA robot, a Delta robot, or any other type of robotic mechanism capable of changing the position of an end effector.

A processing system 112 coupled to robotic arm 102 provides any necessary actuation commands to robotic arm 102 and end effector 104, based on inputs provided to processing system 112 by an imaging system 114 or other systems. In some embodiments, imaging system 114 uses one or more imaging devices to provide processing system 112 with visual information associated with the operation with robotic actuator 116. In some embodiments, imaging system 114 may include one or more camera systems. In other embodiments, imaging system may include infrared emitters and associated sensors, or any other type of sensing device. The visual information provided to processing system 112 by imaging system 114 may include still images, video data, infrared images, and the like.

In some embodiments image processing software running on processing system 112 processes the visual information received from imaging system 114 to generate the appropriate actuation commands to robotic actuator 116. Visual information from imaging system 114 may also be used by processing system 112 to identify a fixture or object that has been picked up by robotic actuator 116.

In some embodiments, processing system 112 issues commands to robotic arm 102 based on processing visual information from imaging system 114. When commanded to pick up a fixture or object, robotic arm 102 is configured to move in the direction of the targeted fixture or object based on actuation commands received from processing system 112. When processing system 112 determines that end effector 104 is positioned in a location to grasp the fixture or object, end effector 104 is activated to grasp the fixture or object. Similarly, processing system 112 may instruct end effector 104 to release the fixture or object when an appropriate destination location is reached.

In some embodiments, processing system 112 may actuate robotic arm 102 to position end effector 104 at a point in three-dimensional space, where the positioning process may be aided by visual information provided by imaging system 114 (i.e., move the end effector 104 within view of at least one camera associated with imaging system 114). When processing system 112 determines that the targeted fixture or object has reached the desired destination, processing system 112 issues a command to deactivate end effector 104, so that the targeted fixture or object is released at the desired destination.

In some embodiments, well-known path planning algorithms can be implemented on processing system 112 to allow the path of a gripped fixture or object to follow a desired trajectory. This approach is also applicable to robotic arms with multiple pivot points. Obstacle avoidance can also be included in the processing software, where a robotic arm in motion can use feedback sensors to detect the presence of an obstacle along the path of motion and halt operations until the obstacle is removed and the system reset.

Although one robotic actuator 116 is shown in the embodiment of FIG. 1, other embodiments may include two or more robotic actuators 116 mounted proximate work surface 110. For example, one robotic actuator 116 may be intended for mounting fixtures on work surface 110 and another robotic actuator 116 may be intended for moving objects. In a particular example, fixtures are significantly lighter in weight than the objects being moved. In this example, the robotic actuator 116 handling fixtures may be lighter duty than the robotic actuator 116 handling the heavier objects. The multiple robotic actuators 116 may be mounted in different portions of work surface 110 such that the robotic actuators 116 do not interfere with one another. The multiple robotic actuators 116 may operate simultaneously to place fixtures and move objects, thereby improving the operating speed of the system.

Figure 2:
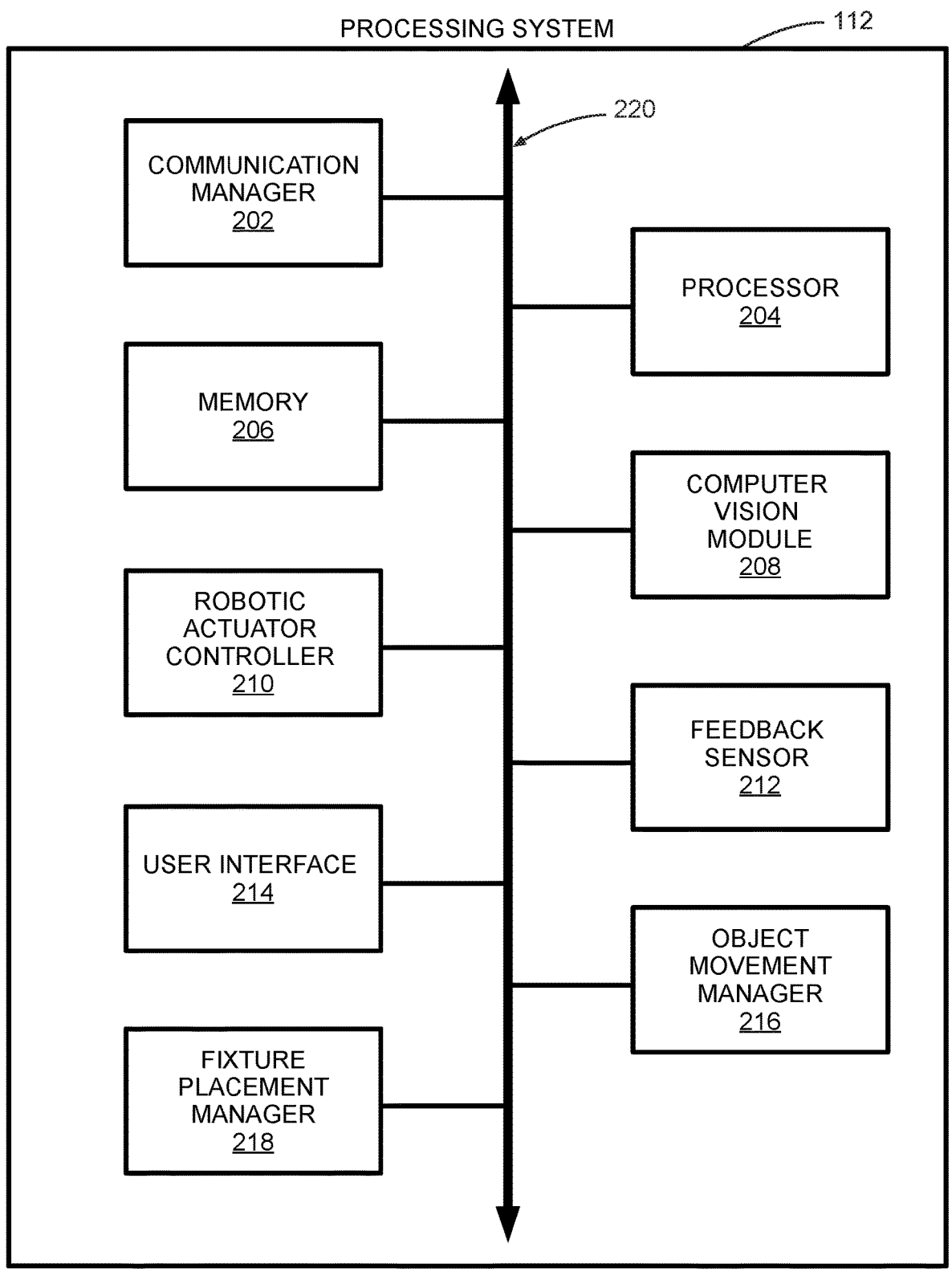
FIG. 2 is a block diagram depicting an embodiment of a processing system capable of operating a robotic system configured to manipulate a fixture, an object, or other item.

FIG. 2 is a block diagram depicting an embodiment of processing system 112, which is capable of operating robotic arm 102 as discussed herein. FIG. 2 depicts an embodiment of processing system 112 that may be used to implement certain functions of robotic system 100 discussed herein. In some embodiments, processing system 112 includes a communication manager 202 that manages communication protocols and associated communication with external peripheral devices as well as communication within other components in processing system 112. For example, communication manager 202 may be responsible for generating and maintaining the interface between processing system 112 and imaging system 114. Communication manager 202 may also manage communication between the different components within processing system 112.

Processing system 112 also includes a processor 204 configured to perform functions that may include generalized processing functions, arithmetic functions, and so on. Data storage for both long-term data and short-term data may be accomplished by a memory 206. A computer vision module 208 may be configured to process visual information received from imaging system 114 via, for example, communication manager 202. In some embodiments, computer vision module 208 determines the approximate location of a fixture or object that is to be gripped, or the approximate location of where a fixture or object is to be released. Computer vision module 208 may implement standard image recognition and image processing algorithms. Additional details of computer vision module 208 are provided herein.

Commands for robotic actuator 116 may be generated by a robotic actuator controller 210 that generates commands that may cause motion in robotic arm 102, or commands that activate or deactivate end effector 104. A feedback sensor 212 processes feedback from sensors associated with robotic actuator 116, such as load cells or any similar displacement measurement sensors configured to measure linear or angular displacements. In some embodiments, a load cell is defined as a transducer that is used to create an electrical signal whose magnitude is substantially directly proportional to a force being measured. In some embodiments, a displacement measurement sensor is defined as a transducer that is used to create an electrical signal whose magnitude is dependent on a displacement being measured. Measured displacements could include linear or angular displacements. One or more load cells associated with feedback sensor 212 may provide outputs that measure how much force is being exerted on robotic actuator 116. Outputs from one or more displacement measurement sensors associated with feedback sensor 212 may be used by processor 204 to determine, for example, any additional displacement (linear or angular) that may need to be generated in robotic actuator 116.

In some embodiments, processing system 112 may also include a user interface 214 that can receive commands from a user or display information to the user. For example, commands received from a user may be basic on/off commands, and may include variable operational speeds. Information displayed to a user by user interface 214 may include, for example, system health information and diagnostics. User interface 214 may include interfaces to one or more switches or push buttons, and may also include interfaces to touch-sensitive display screens.

Processing system 112 further includes an object movement manager 216 that determines which objects need to be moved. Object movement manager 216 also determines where the objects are currently located and where they need to be moved. A fixture placement manager 218 is capable of determining where to place one or more fixtures on a work surface. For example, fixture placement manager 218 may determine fixture placement locations based on the planned movement of objects as determined by object movement manager 216. Additionally, fixture placement manager 218 may analyze a particular object using, for example, image data captured by imaging system 114. By analyzing the shape and configuration of a particular object, fixture placement manager 218 can determine what one or more types of fixtures are useful to aid in the manipulation of the object. Based on the analysis of the object, fixture placement manager can also determine the best locations for the one or more fixtures. Data flow within processing system 112 may be routed via a data bus 220.

Figure 3:
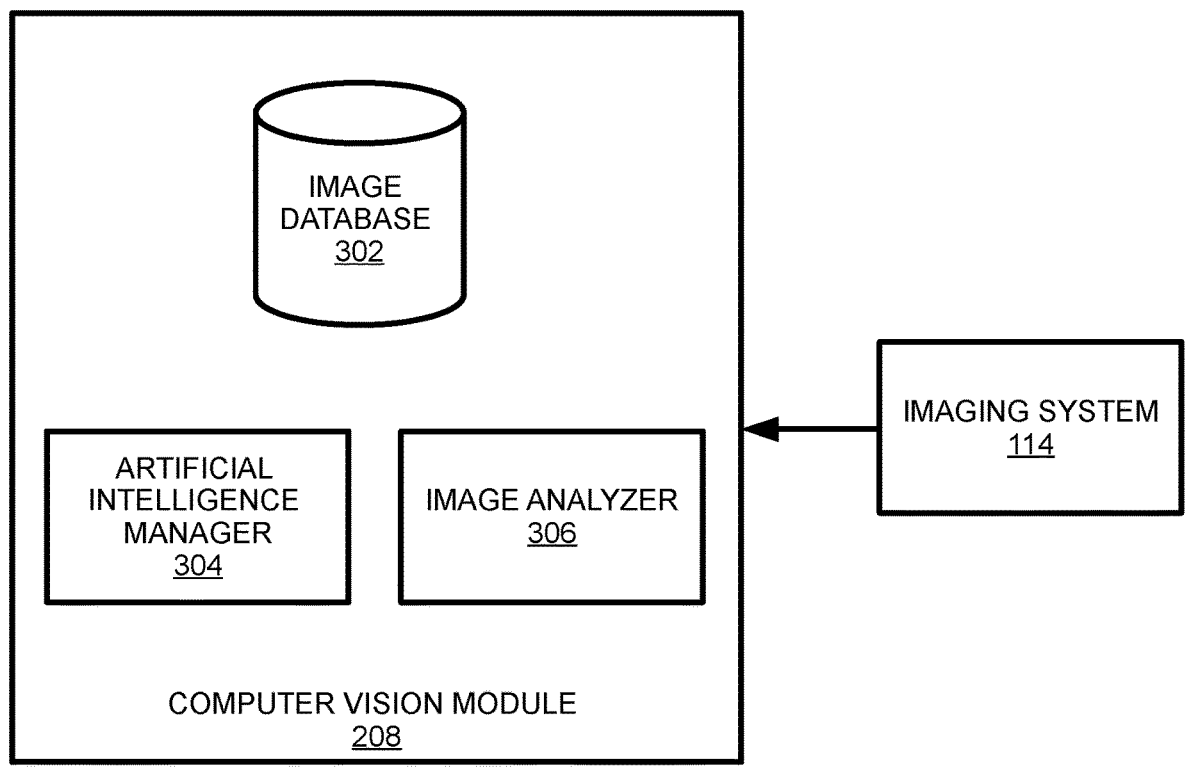
FIG. 3 is a block diagram depicting an embodiment of an imaging system coupled to a computer vision module.

FIG. 3 is a block diagram depicting an embodiment of imaging system 114 coupled to computer vision module 208. In some embodiments, imaging system 114 and computer vision module 208 communicate via communication manager 202 (FIG. 2). Computer vision module 208 receives visual information associated with, for example, a fixture or object from imaging system 114. Computer vision module 208 processes this visual information to determine, for example, the position of the fixture or object relative to an end effector, such as end effector 104.

In some embodiments, computer vision module 208 includes an image analyzer 306 that performs algorithmic analysis on visual information received from imaging system 114. An artificial intelligence manager 304 included in computer vision module 208 may implement artificial intelligence image recognition or similar algorithms. An image database 302 included in computer vision module 208 may store reference images that are accessed by image analyzer 306 or artificial intelligence manager 304. Together image analyzer 306 and artificial intelligence manager 304 use the reference images in image database 302 to perform image recognition on the visual information received from imaging system 114. In some embodiments, standard image processing algorithms are used to implement the functionality of computer vision module 208. In other embodiments, the functionality of computer vision module 208 may be implemented using customized image processing algorithms.

Figure 4:
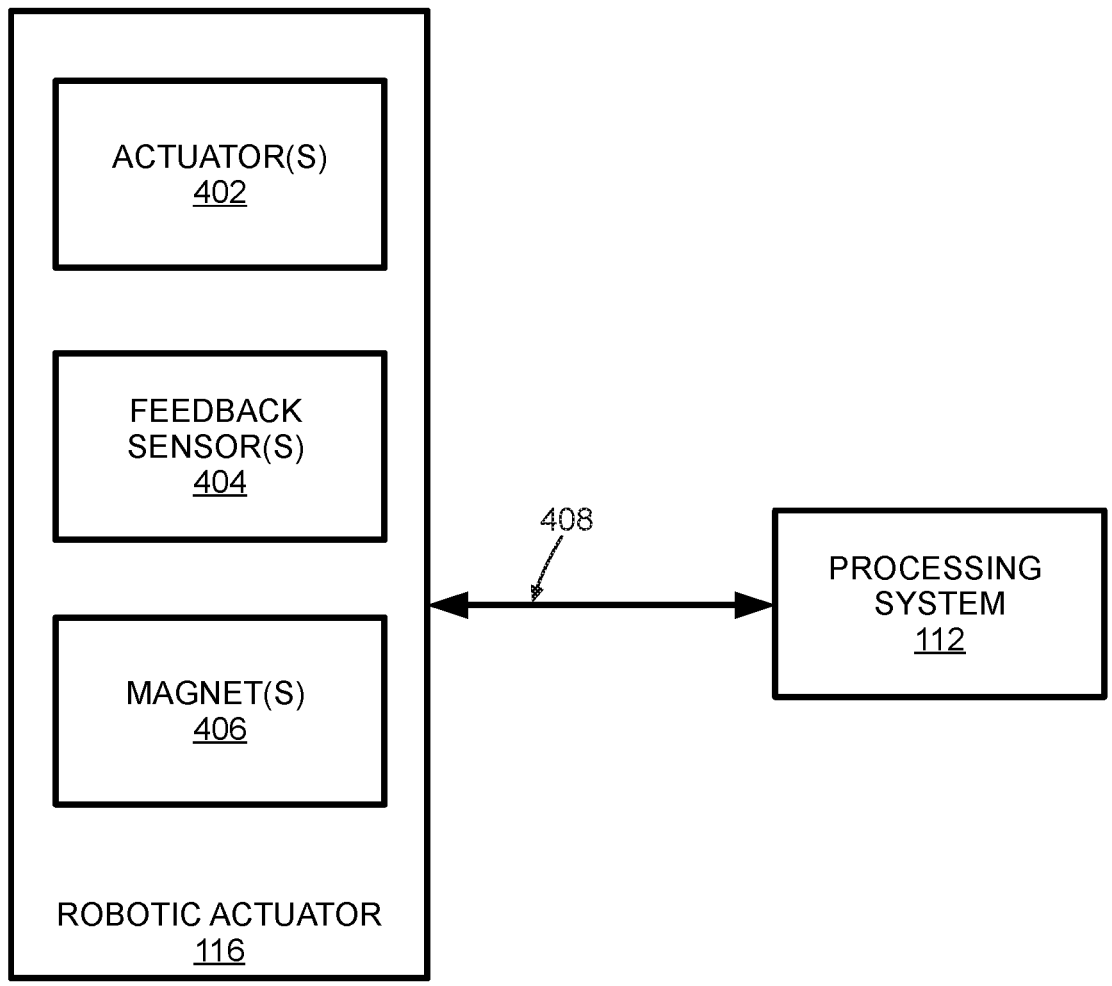
FIG. 4 is a block diagram depicting an embodiment of a subsystem including a robotic actuator and a processing system.

FIG. 4 is a block diagram depicting robotic actuator 116 and processing system 112. In some embodiments, robotic actuator 116 includes robotic arm 102 and end effector 104. Robotic actuator 116 is coupled to processing system 112 via a bidirectional communications link 408. In some embodiments, robotic actuator 116 is coupled to communication manager 202 via bidirectional communications link 408.

Processing system 112 issues commands to robotic actuator 116 and receives data from robotic actuator 116 via bidirectional communications link 408. In some embodiments, robotic actuator 116 includes actuators 402, such as servomotors, dc motors, and the like. Actuators 402 may be controlled by commands from processing system 112 that are generated in response to results from image processing operations as provided by computer vision module 208. Commands to actuators 402 may include initiating motion, maintaining motion or stopping motion.

In some embodiments, robotic actuator 116 also includes one or more feedback sensors 404, which provide sensor data to processing system 112 via bidirectional communications link 408. Feedback sensors 404 may include load sensors, position sensors, angular sensors, and the like. In some embodiments, load sensors (or load cells) are configured to generate electrical signals that are substantially proportional to an applied force. Load sensors are used to measure forces that may be encountered, for example, by robotic arm 102. In some embodiments, position sensors and angular sensors are configured to measure linear displacements and angular displacements respectively, of robotic arm 102 or end effector 104. These linear displacement and angular displacement measurements provide an indication of the position of robotic arm 102 or end effector 104 in three-dimensional space. Data from feedback sensors 404 may be used by processing system 112 to implement, for example, closed-loop control algorithms for positioning robotic actuator 116 in three-dimensional space.

In some embodiments, robotic actuator 116 also includes one or more magnets 406 associated with end effector 104. These magnets are used when end effector 104 is a magnetic end effector. Processing system 112 issues commands to activate or deactivate magnets 406 via bidirectional communications link 408. In this way, robotic actuator 116 may be commanded to grip and lift a magnetic fixture or object from a designated location or release it at a designated location.

Figure 5:
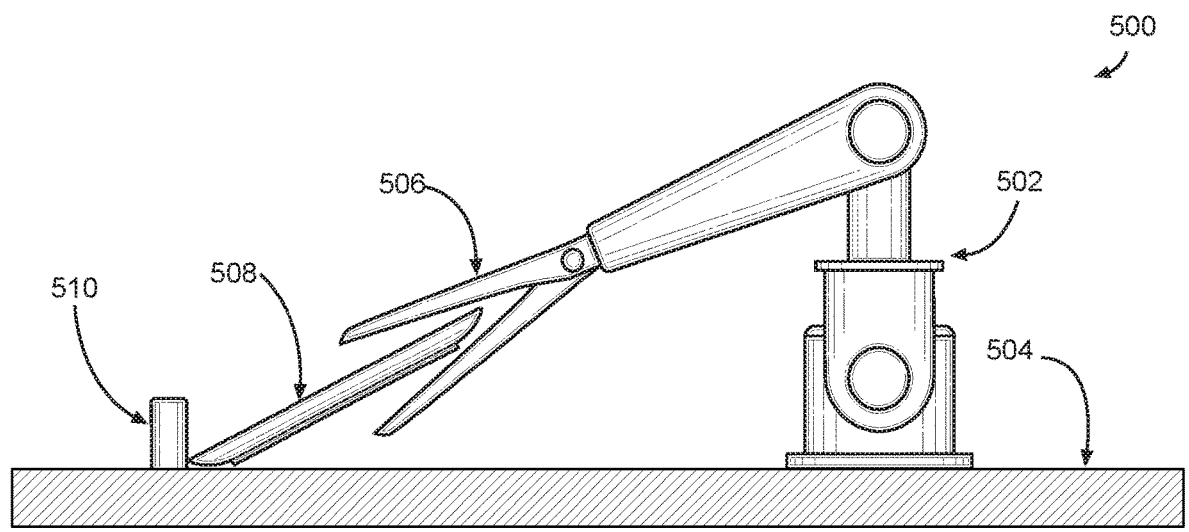
FIG. 5 is a schematic diagram depicting an embodiment of a robotic system grasping an object.

FIG. 5 is a schematic diagram depicting an embodiment of a robotic system 500 grasping an object. Robotic system 500 includes a robotic arm and other components similar to those discussed above with respect to FIG. 1. In some embodiments, robotic system 500 includes a robotic actuator 502 attached to a work surface 504. Robotic actuator 502 includes a grasping type mechanical manipulator 506 capable of grasping and releasing a fixture, object, or other item. In the example of FIG. 5, a fixture 510 is attached to (or mounted to) work surface 504. Fixture 510 may include a wall, a post, a wedge, an L-shaped bracket, or any other type of fixture. In particular implementations, fixture 510 may include a shock absorbing material that allows fragile or breakable items to be dropped onto the work surface without damage.

As illustrated in FIG. 5, fixture 510 provides a barrier to prevent movement of an object 508 (e.g., a dish) when manipulator 506 attempts to pick up object 508. In many situations, the coefficient of friction of work surface 504 is low, which allows objects (such as dishes) to easily slide on work surface 504. On this type of work surface, an object may be difficult to pick up by manipulator 506 unless the object has a protrusion or other portion that is easy to grasp by manipulator 506. In this example, manipulator 506 lifts a first side of object 508 while the opposite side of object 508 is secured by fixture 510. Thus, manipulator can obtain a good grasp of object 508 without having object 508 slide on work surface 504.

Figure 6:
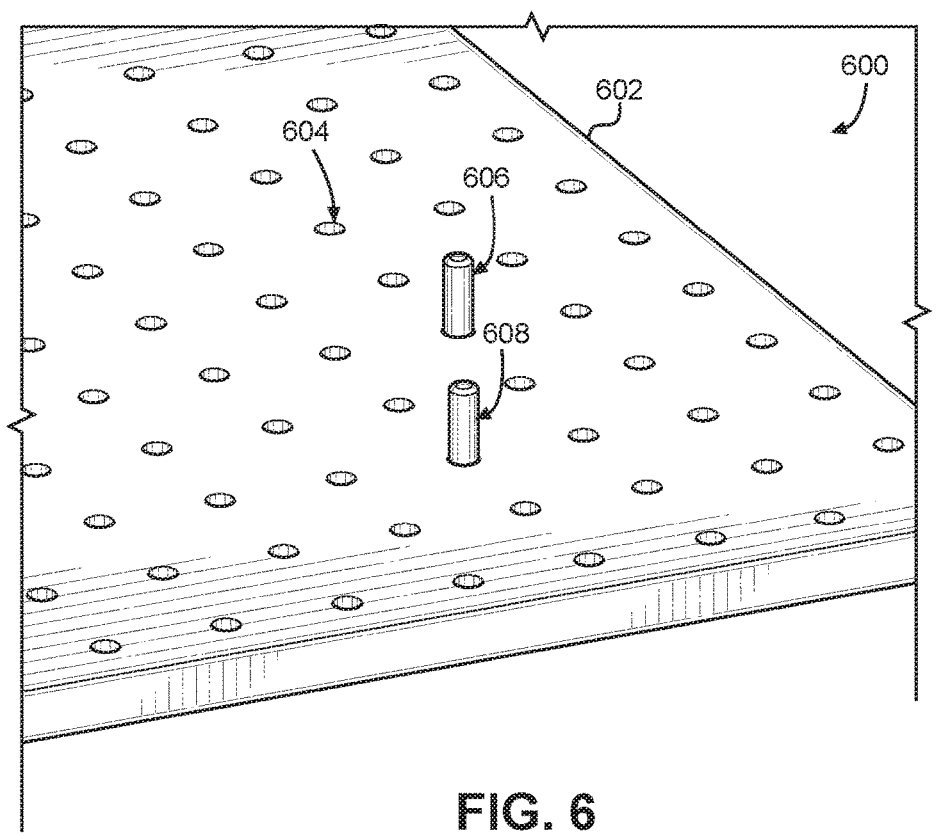
FIG. 6 is a schematic diagram depicting example posts or pins inserted into holes in a work surface.

FIG. 6 is a schematic diagram 600 depicting example posts or pins inserted into holes in a work surface. In some embodiments, a work surface 602 has multiple holes 604 (or apertures) to receive any number of posts, pins, or other items. In some embodiments, work surface 602 has a regular and repeating patterns of holes 604. In the example of FIG. 6, two posts 606 and 608 are shown as inserted into two holes 604. Posts 606 and 608 are held in place within holes 604, for example, due to friction between posts 606, 608 and the inner surface of holes 604. As discussed herein, one or both of posts 606, 608 may be used to restrain and tilt an object being grasped by a robotic actuator. In some embodiments, a particular fixture may have one or more pins or posts that are of a proper size, shape, and spacing to insert into one or more holes 604 of work surface 602. The engagement between the fixture's pins and holes 604 secures the fixture to work surface 602. As discussed herein, a robotic actuator may insert pins 606, 608 into holes 604 and remove pins 606, 608 from holes 604. Similarly, the robotic actuator may place a fixture on work surface 602 such that one or more pins extending from the fixture engage one or more holes 604 in work surface 602.

Additional types of fixtures may be secured to a work surface using magnetic, vacuum, friction, or gravitational forces.

Figure 7:
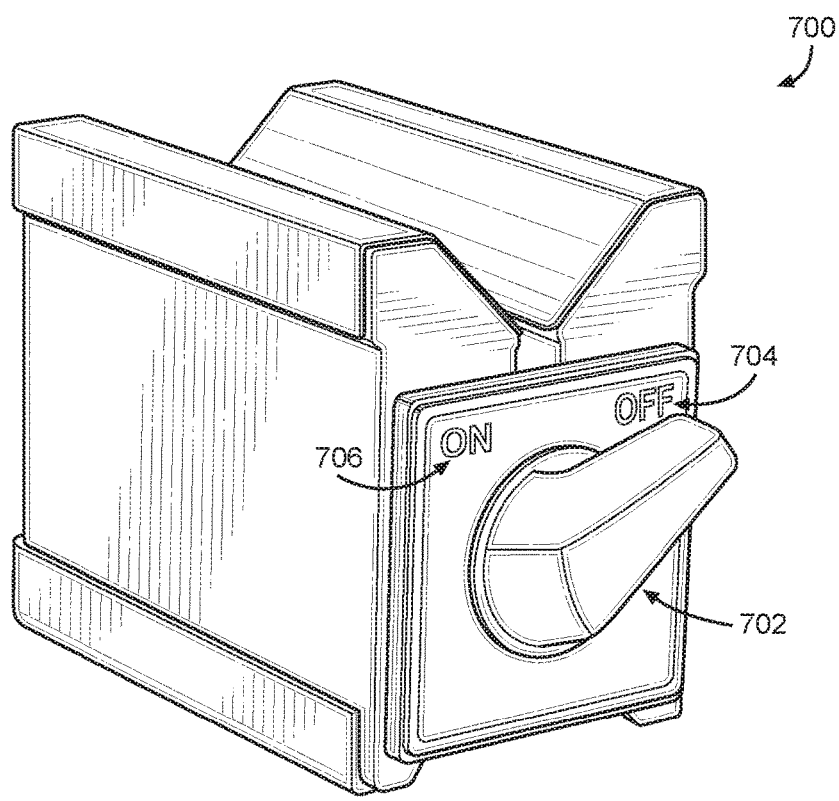
FIG. 7 depicts an embodiment of a magnetically actuated fixture capable of being temporarily attached to a work surface.

FIG. 7 depicts an embodiment of a magnetically actuated fixture 700 capable of being temporarily attached to a work surface. In some embodiments, fixture 700 has two side walls made of iron that are separated by a non-magnetic material that contains a rotating magnet. A rotatable lever 702 moves between an "on" position 706 and an "off" position 704. When lever 702 is in on position 706, the magnet associated with fixture 700 is activated such that fixture 700 can magnetically engage a metallic work surface. When activated, fixture 700 provides a secure support for objects, such as dishes. When lever 702 is in off position 704, the magnet associated with fixture 700 is deactivated such that fixture 700 is no longer magnetically engaged with the work surface. When lever is in off position 704, a robotic actuator may remove fixture 700 from the work surface. In some embodiments, an end effector on a robotic actuator may operate lever 702 to move it between off position 704 and on position 706.

In some embodiments, fixture 700 includes a rotating magnet. When the poles of the rotating magnet are rotated to be contained in the non-magnetic material, fixture 700 does not generate any magnetic attractive force. And, when the magnet is rotated so that its north pole is contained in one of the iron walls and the south pole is contained in the other iron wall, the iron walls duct magnetic flux through the base of fixture 700 and cause it to be attracted to a metal surface, such as a metal work surface. In other embodiments, any type of magnetic system may be used with fixture 700, such as electromagnetic systems, electrostatic adhesion, and the like.

Figure 8:
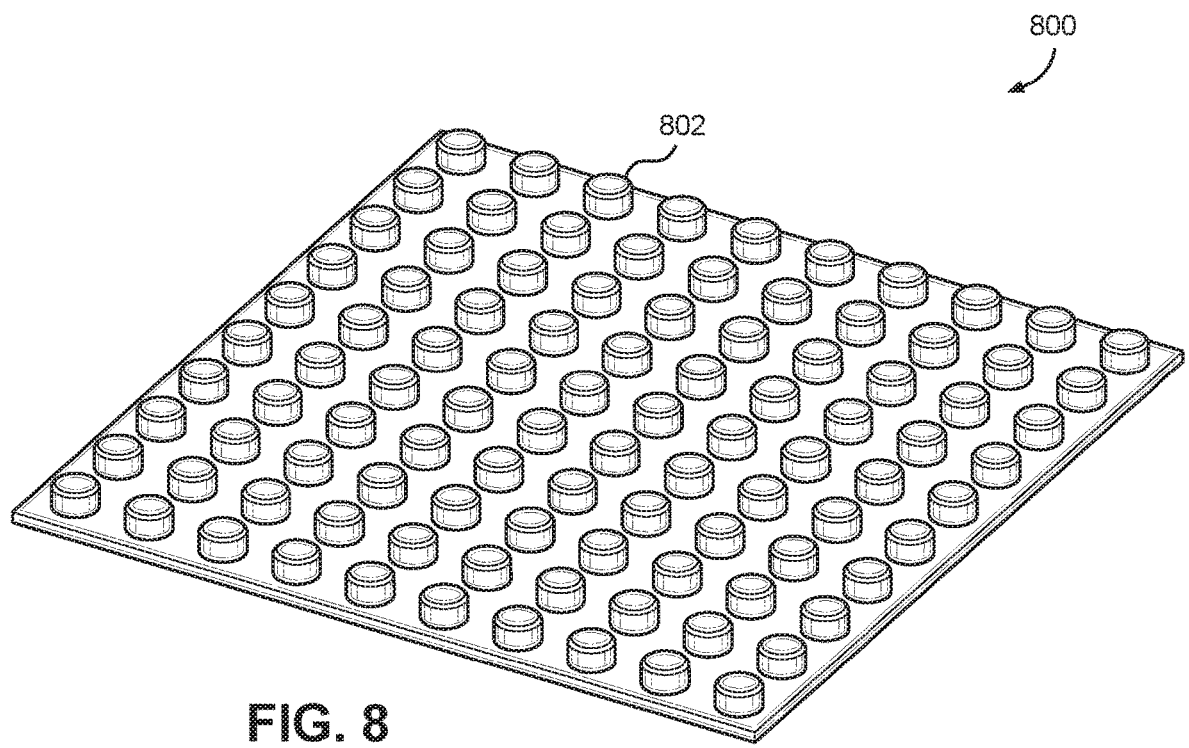
FIG. 8 depicts an embodiment of a high friction mat capable of being temporarily or permanently attached to a work surface.

FIG. 8 depicts an embodiment of a high friction mat 800 capable of being temporarily or permanently attached to a work surface. High friction mat 800 can be placed on a work surface to increase the coefficient of friction between the object being grasped and the work surface. The increased coefficient of friction allows a manipulator to apply greater force when grasping an object without the object sliding along the work surface. As shown in FIG. 8, high friction mat 800 includes multiple "bumps" or protrusions 802 that extend outwardly from high friction mat 800. Protrusions 802 provide spacing for the finger (or other portion) of a grasper to slide under an object. This is particularly useful in the case of a flat object located on a flat surface. Without protrusions 802, it would be difficult for the finger of a grasper to slide between the object and the flat surface. In the example of FIG. 8, the finger can slide between adjacent protrusions 802 so the grasper can properly grasp the object. In other embodiments, high friction mat 800 does not include protrusions 802, but may include other textures to increase the coefficient of friction of high friction mat 800 and provide varying surface levels that allow a finger of a grasper to slide between an object and the surface of high frication mat 800. In particular implementations, high friction mat 800 is manufactured from a polyurethane material. In some embodiments, high friction mat 800 is attached to (or placed on) a work surface to allow substantially flat objects to be more easily grasped by a grasper.

Figure 9:
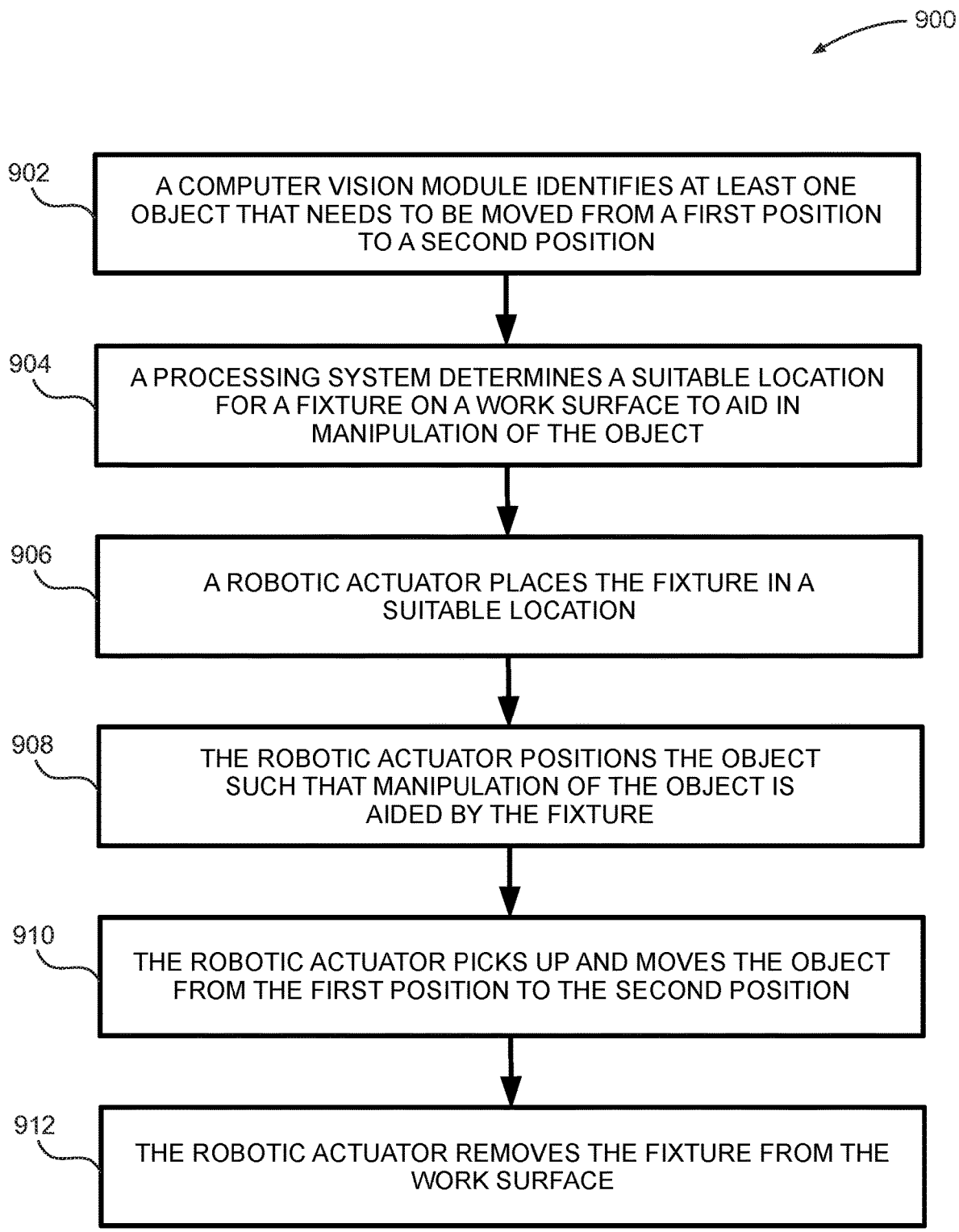
FIG. 9 is a flow diagram depicting an embodiment of a method for placing fixtures on a work surface to assist with the movement of objects from a first position to a second position.

FIG. 9 is a flow diagram depicting an embodiment of a method 900 for placing fixtures on a work surface to assist with the movement of objects from a first position to a second position. Initially, a computer vision module or imaging system identifies 902 at least one object that needs to be moved from a first position to a second position. A processing system determines 904 a suitable location for a fixture on a work surface to aid in manipulation of the object being moved. Additional details regarding determination of the suitable location for the fixture are discussed herein with respect to FIG. 12.

Method 900 continues as a robotic actuator places 906 the fixture in a suitable location. In some embodiments, the robotic actuator places multiple fixtures on a work surface depending on the object being moved and the types of fixtures needed to assist with manipulating the object. As discussed above, fixture placement manager 218 may analyze the object being moved based on image data associated with the object. This analysis may include considering the shape, size, and orientation of the object. Based on the analysis, fixture placement manager 218 can determine what fixtures are needed to grasp the object. For example, if the object is substantially flat and positioned on a flat work surface, a wedge fixture or a friction mat (of the type described with respect to FIG. 8) may be useful in positioning a finger of a grasping device between the object and the work surface. A wedge fixture may be pushed against the object, thereby causing an edge of the object to slide along the angled wedge surface such that the edge of the object is spaced apart from the work surface (i.e., raised above the work surface). In another embodiment, an object is pushed against a wedge fixture such that the edge of the object contacting the wedge tilts downward toward the work surface, thereby raising the opposite side of the object for easier grasping.

In another example, if a particular object is part of a stack of objects, a fixture wall may aid in grasping the top object in the stack while avoiding sliding the entire stack of objects or accidentally pushing one or more objects off the stack. A particular type of fixture wall has an adjustable height, such that the height changes bases on the number of stacked objects. Each time an object is removed from the stack, the height of the wall is lowered (e.g., pushed downward by a robotic actuator) by collapsing the wall down to the approximate level of the next object on the stack. This adjustable height wall fixture allows the top object to be removed from the stack while continuing to support the remaining objects in the stack (i.e., below the top object). In other examples, multiple pins can be inserted into multiple holes (as discussed with respect to FIG. 6) to assist with grasping and manipulating an object. The multiple holes and multiple pins support various arrangements and shapes to assist with grasping and manipulating objects having a variety of different shapes.

In some situations, multiple fixtures are used simultaneously to aid in manipulating an object. For example, a particular object may not be in a position where it can be easily grasped. In this situation, a robotic actuator may place a wedge fixture next to the particular object and place a shock absorbing fixture adjacent to the wedge fixture. The robotic actuator pushes the object up the "ramp" surface of the wedge fixture so the object tips over the edge of the wedge fixture and falls on the shock absorbing fixture. This movement leaves the object at an angled position with an exposed surface (or edge) that can be grasped by the robotic actuator. Various other combinations of multiple fixtures may be used to aid in manipulation of specific objects.

The robotic actuator positions 908 the object such that manipulation of the object is aided by the fixture. The robotic actuator then picks up and moves 910 the object from the first position to the second position. After the object has been moved to the second position, the robotic actuator releases the object. The desired movement of the object from the first position to the second position is determined, for example, using a process of the type discussed herein with respect to FIG. 11. The object may be picked up by the robotic actuator using various techniques depending on the type of end effector on the robotic actuator and the type of object being moved. After the object has been released by the robotic actuator, another object may be moved using the same fixture. In some embodiments, after the object has been released by the robotic actuator, the robotic actuator removes 912 the fixture from the work surface and stores the fixture for future use. The robotic actuator may then determine the next object to be moved and select an appropriate fixture as discussed above. In some situations, the robotic actuator repositions one or more fixtures already mounted to the work surface to different locations to aid in manipulating different objects.

In some embodiments, many objects can be processed sequentially without needing to remove or reposition fixtures on the work surface. For example, if a series of objects have an edge or lip that is easy for the end effector to grasp, the robotic actuator does not need to remove or reposition fixtures on the work surface. However, when a new (or different) object is presented that cannot be easily grasped, the robotic actuator determines how to replace or reposition one or more fixtures to aid in the manipulation of the new object. In this arrangement, the end effector is designed to easily grasp the majority of objects. By using one or more fixtures to aid in grasping the few objects that are more difficult to grasp, the end effector can be relatively simple rather than trying to design a complex end effector that can grasp every possible type of object.

Figure 10A:
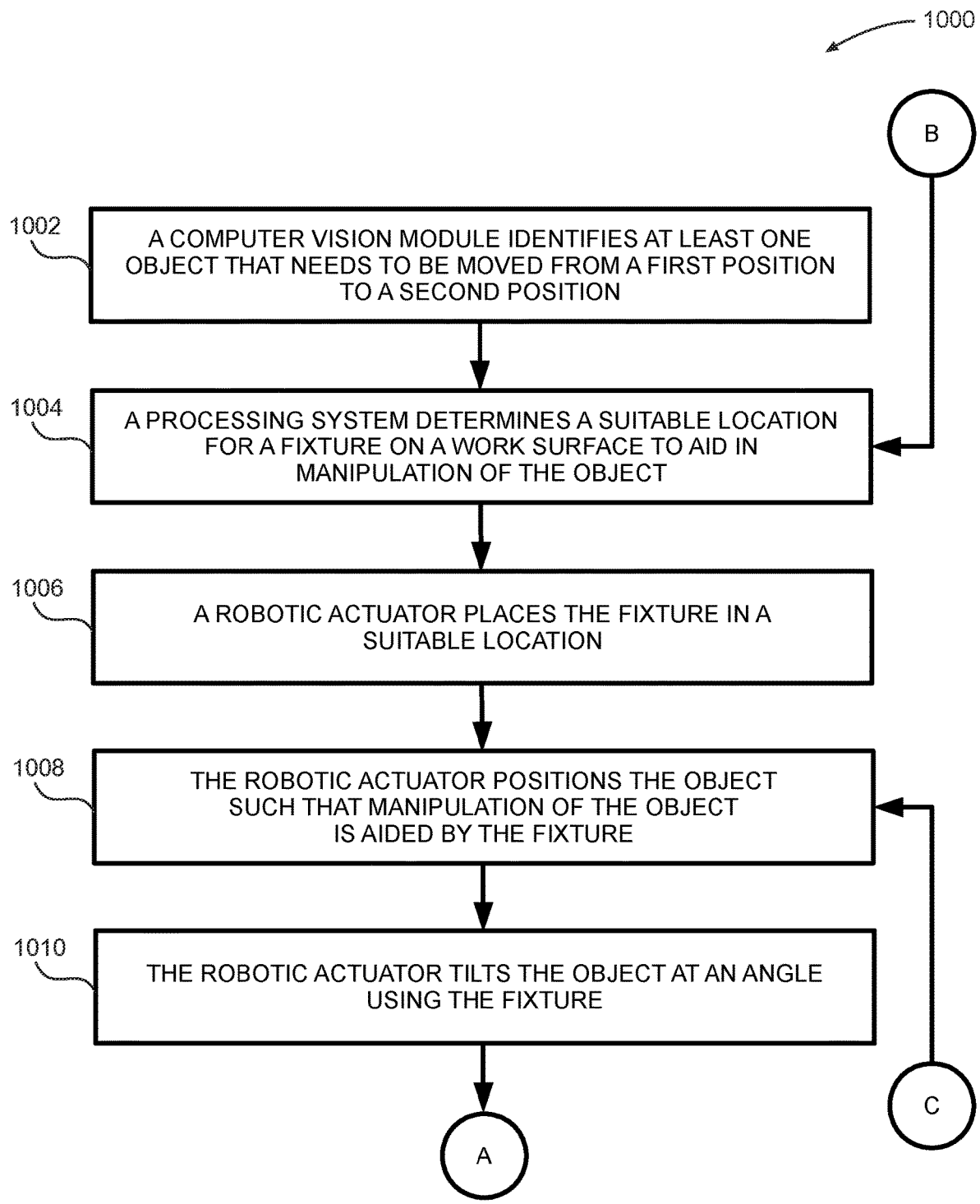
FIGS. 10A-10B represent a flow diagram depicting an embodiment of a method for grasping and moving one or more objects from a first position to a second position.
Figure 10B:
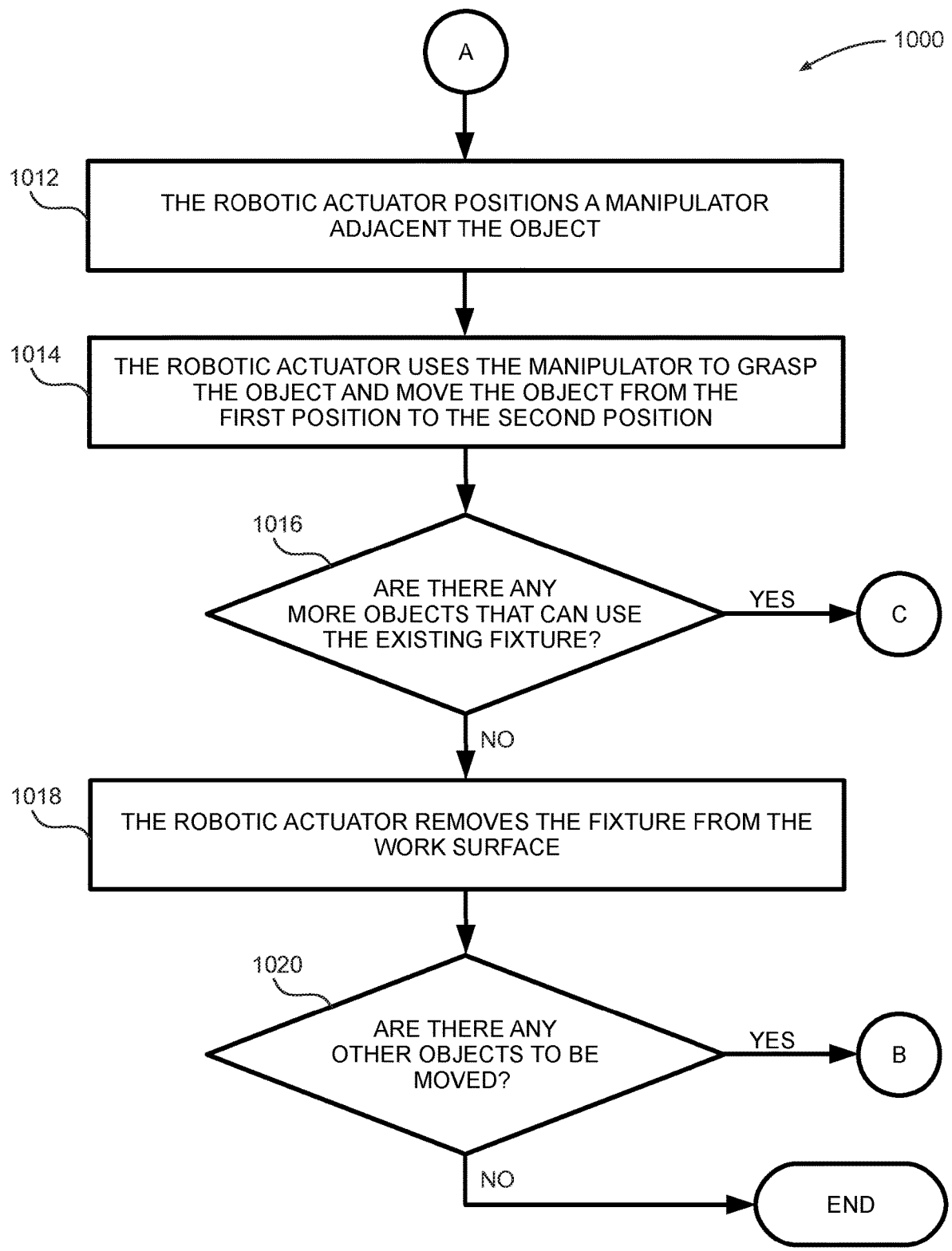

FIGS. 10A-10B represent a flow diagram depicting an embodiment of a method 1000 for grasping and moving one or more objects from a first position to a second position. Initially, a computer vision module or imaging system identifies 1002 at least one object that needs to be moved from a first position to a second position. A processing system then determines 1004 a suitable location for a fixture on a work surface to aid in manipulation of the object being moved. A robotic actuator places 1006 the fixture in a suitable location and positions 1008 the object such that manipulation of the object is aided by the fixture. The robotic actuator then tilts 1010 the object at an angle using the fixture to restrain the object.

Method 1000 continues as the robotic actuator positions 1012 a manipulator (e.g., a grasping manipulator associated with an end effector of the robotic actuator) adjacent the object. Depending on the position of the object and the manner in which the object will be grasped, the robotic actuator may position a manipulator under the object, adjacent the object, or in any other location that allows grasping of the object. The robotic actuator uses 1014 the manipulator to grasp the object and move the object from the first position to the second position. Method 1000 then determines 1016 whether more objects need to use the same fixture. If additional objects need to use the same fixture, method 1000 returns to 1008 to select the next object. If the fixture is not needed for more objects, the robotic actuator removes 1018 the fixture from the work surface. If additional objects remain to be moved, method 1000 continues to 1004 to determine a suitable fixture location for the next object. If no objects remain to be moved, method 1000 ends.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. An apparatus comprising:
   a robotic actuator;
   a processing system coupled to the robotic actuator, wherein the processing system is configured to generate commands for positioning the robotic actuator;
   a vision system coupled to the processing system, wherein the vision system is configured to process visual information proximate the robotic actuator; and
   a fixture configured to be placed on a work surface to aid in manipulating an object, wherein the robotic actuator is configured to manipulate the fixture;
   wherein the processing system is further configured to:
   (a) identify the object on the work surface using the vision system;
   (b) determine an object location of the object on the work surface using the vision system;
   (c) determine a fixture location adjacent the object on the work surface;
   (d) after performing (a), (b), and (c), place, with the robotic actuator, the fixture at the fixture location;
   (e) after performing (d), engage the object with the robotic actuator by pushing the object against the fixture with the robotic actuator; and
   (f) after performing (e), raise the object from the work surface with the robotic actuator.

2. The apparatus of claim 1, wherein the robotic actuator manipulates the fixture based on commands from the processing system.

3. The apparatus of claim 1, wherein the processing system uses visual information from the vision system to determine a position of the fixture on the work surface.

4. The apparatus of claim 1, wherein the fixture includes at least one of an L-shaped bracket, a wedge, a post, a friction mat, a shock absorbing material, and a fixture wall attached to the work surface.

5. The apparatus of claim 1, wherein the fixture is attached to the work surface using at least one of gravity, friction, magnetic attraction, and adhesive.

6. The apparatus of claim 1, wherein the work surface includes a plurality of holes into which at least a portion of the fixture is attached.

7. The apparatus of claim 1, wherein the fixture is attached to the work surface using magnetic attraction between the fixture and the work surface.

8. The apparatus of claim 1, further comprising a second robotic actuator, wherein one robotic actuator is configured to manipulate the fixture and the second robotic actuator is configured to manipulate the object.

9. The apparatus of claim 1, wherein the fixture is a textured mat having a plurality of protrusions, and wherein a manipulator associated with the robotic actuator is configured to be positioned between adjacent protrusions and slide under the object.

10. The apparatus of claim 1, wherein the robotic actuator is further configured to place a plurality of fixtures on the work surface and use the plurality of fixtures to aid in manipulating the object.

11. The apparatus of claim 1, wherein the robotic actuator uses visual information from the vision system to manipulate the object, and wherein manipulation of the object includes using the fixture as a physical restraint to the object.

12. The apparatus of claim 1, wherein the processing system is further configured to determine where to place the fixture on the work surface based on an analysis of image data associated with the object.

13. The apparatus of claim 1, wherein the processing system is further configured to determine a type of fixture to place on the work surface based on a shape and an orientation of the object.

14. A method comprising:
  a) identifying, using a computer vision system, an object for movement from a first position to a second position;
  b) determining, by a processing system, a suitable location for a fixture on a work surface to aid in manipulating the object;
  c) after performing (a) and (b), placing, using a robotic actuator configured to receive commands from the processing system, the fixture in the suitable location;
  (d) after performing (c), pushing, using the robotic actuator, the object against the fixture effective to tilt the object;
  after performing (d) grasping, using the robotic actuator, the object with the aid of the fixture; and
  moving, using the robotic actuator, the object from the first position to the second position.

15. The method of claim 14, wherein determining the suitable location for the fixture on the work surface includes analyzing image data associated with the object.

16. The method of claim 14, further comprising determining a type of fixture to place on the work surface based on a shape and an orientation of the object.

17. The method of claim 14, wherein the fixture includes at least one of an L-shaped bracket, a wedge, a post, a friction mat, a shock absorbing material, and a fixture wall attached to the work surface.

18. The method of claim 14, wherein the fixture is attached to the work surface using at least one of gravity, friction, magnetic attraction, and adhesive.

19. A method comprising:
  (a) identifying, using a computer vision system, an object to be grasped by a robotic actuator;
  (b) analyzing image data associated with the object;
  (c) determining, based on the image data, a suitable location for each of a plurality of fixtures on a work surface to aid in manipulating the object;
  (d) after performing (a), (b), and (c), and placing the plurality of fixtures by the robotic actuator in the suitable locations;
  pushing the object against the plurality of fixtures by the robotic actuator; and
  grasping, using the robotic actuator, the object with the aid of the fixture.

20. The method of claim 19, further comprising determining a first type of fixture and a second type of fixture to place on the work surface based on a shape and an orientation of the object.

* * * * *